US007918318B2

(12) United States Patent

Friedli et al.

(10) Patent No.: US 7,918,318 B2

(45) Date of Patent: Apr. 5, 2011

(54) METHOD AND SYSTEM FOR MODERNIZATION OF AN ELEVATOR INSTALLATION

(75) Inventors: Paul Friedli, Remetschwil (CH); Lukas Finschi, Lucerne (CH)

(73) Assignee: Inventio AG, Hergiswil NW (CH)

( * ) Notice: Subject to any disclaimer, the term of this patent is extended or adjusted under 35 U.S.C. 154(b) by 615 days.

(21) Appl. No.: 11/962,474

(22) Filed: Dec. 21, 2007

(65) Prior Publication Data

US 2008/0149432 A1 Jun. 26, 2008

(30) Foreign Application Priority Data

Dec. 21, 2006 (EP) .................................... 06126743

(51) Int. Cl.
*G05B 15/00* (2006.01)

(52) U.S. Cl. ......... 187/247; 187/380; 187/382; 187/391

(58) Field of Classification Search .................. 187/247, 187/380, 382, 391

See application file for complete search history.

(56) References Cited

U.S. PATENT DOCUMENTS

| | | | | |
|---|---|---|---|---|
| 4,844,204 A * | 7/1989 | Ovaska et al. | ................ | 187/247 |
| 5,352,857 A * | 10/1994 | Ovaska | ......................... | 187/247 |
| 5,389,748 A * | 2/1995 | Burke et al. | .................. | 187/247 |
| 6,062,343 A * | 5/2000 | Wang | ............................ | 187/247 |
| 6,439,349 B1 * | 8/2002 | Smith | ........................... | 187/382 |
| 6,892,861 B2 * | 5/2005 | Friedli | .......................... | 187/247 |
| 6,935,465 B2 * | 8/2005 | Friedli | .......................... | 187/247 |

FOREIGN PATENT DOCUMENTS

| | | | |
|---|---|---|---|
| EP | 0 631 965 | A | 1/1995 |
| EP | 1 319 625 | A1 | 6/2006 |
| GB | 2 156 104 | A | 10/1985 |
| JP | 2003 081556 | A | 3/2003 |
| JP | 2006 264888 | A | 10/2006 |

* cited by examiner

*Primary Examiner* — Walter Benson
*Assistant Examiner* — Kawing Chan
(74) *Attorney, Agent, or Firm* — Fraser Clemens Martin & Miller LLC; William J. Clemens

(57) ABSTRACT

A method for modernization of an elevator installation with several elevators in a building, wherein at least one floor terminal for input of a floor call is provided on at least one floor of the building, which floor terminal is, for communication of an input floor call, connected with a group control, and at least one elevator is controlled in drive in accordance with the communicated floor call by the group control, includes connecting at least one call detecting unit, for communication of an input floor call, with the group control. At least one new floor terminal is, for input of a floor call, mounted on at least one floor and the new floor terminal is, for communication of an input floor call, connected with the call detecting unit.

16 Claims, 6 Drawing Sheets

METHOD AND SYSTEM FOR MODERNIZATION OF AN ELEVATOR INSTALLATION

FIELD OF THE INVENTION

The invention relates to a method and system for modernization of an elevator installation.

BACKGROUND OF THE INVENTION

Elevator installations for transport of persons/goods are relatively long-term capital assets with service lives of 20 years and more. If after a time of such length a general overhaul of an elevator installation occurs, then the components of the elevator installation are often aged in terms of technology, which obliges a more or less complete exchange of the components, termed modernization in the following.

It is disadvantageous with this method of modernization of an elevator installation that the transport capacity of the elevator installation during the modernization is at best maintained. If in an elevator installation with, for example, three elevators an elevator is exchanged then this means a temporary reduction in transport capacity by 33%. The users, thereagainst, do not want to suffer any losses in convenience during the modernization and in addition want to be transported as quickly and directly as possible. Long waiting times or inconvenient transfers are regarded as unacceptable.

SUMMARY OF THE INVENTION

An object of the present invention is to provide a method and a system in which, during modernization of an elevator installation, waiting times or transfers, which are perceived as disadvantageous by the users, are largely avoided. This method shall be economic and compatible with proven standards of mechanical construction and of the electronics industry.

According to the present invention, an elevator installation, which is located a building, with several elevators in a building is modernized. At least one floor terminal for input of a floor call is located on at least one floor of the building. The floor terminal is, for communication of an input floor call, connected with a group control. At least one elevator is controlled in drive in accordance with the communicated floor call from the group control. At least one call detecting unit is, for communication of an input floor call, connected with the group control. A new floor terminal for input of a floor call is mounted on at least one floor. The new floor terminal is, for communication of input floor call, connected with the call detecting unit. Advantageously the existing floor terminals on the floor where a new floor terminal is mounted are made inaccessible.

Thus, during the modernization a floor call is input by way of a new floor terminal, which floor call is communicated to the call detecting unit and from there is communicated in direct or indirect mode and manner to the group control. This has the advantage that on this floor a floor call can be input only at a new floor terminal. It is thus avoided that a user inputs a floor call several times, at an old floor terminal and at a new floor terminal. Such multiple input of a floor call needlessly reduces the transport capacity of the elevator installation.

Advantageously, a new group control is thereupon installed. At least one elevator is transferred from the existing group control to the new group control. The transferred elevator is controlled in drive by the new group control and the call detecting unit is, for communication of an input floor call, connected with the new group control.

The call detecting unit thus communicates not only with the old group control, but also with the new group control. The call detecting unit can communicate with the group controls in direct or indirect mode and manner. This makes it possible for the incidence of traffic during the modernization to adapt to the changing transport capacity of the elevator installation.

Advantageously the call detecting unit is an independent unit or a component of a floor terminal. Advantageously several call detecting units are mounted for each floor.

Advantageously floor calls input at the new floor terminal are distributed to the existing group control and to the new group control in accordance with at least one rule. Advantageously a random distribution or an alternating distribution or a performance-related distribution is used as the rule. This has the advantage that if the new group control has greater performance capability, thus has a higher capacity than the existing group control, input floor calls are selectively allocated to this new group control with higher performance capability.

Advantageously at least one new floor terminal for input of a floor call is mounted on several floors, preferably on each floor, and the new floor terminals are, for communication of an input floor call, connected with the call detecting unit.

In advantageous manner the start floor of the input floor terminal is communicated as a start signal to the group control by the call detecting unit and the receipt of the input floor call is communicated as an acknowledgement signal to the call detecting unit by the group control. The deactivation of the acknowledgement signal is detected by the call detecting unit, whereupon the call detecting unit communicates the destination floor of the input floor call as a destination signal to the group control. This has the advantage that the call detecting unit translates a destination call, which is input at a new floor terminal, for the former group control. The call detecting unit initially communicates a start signal and then a destination signal to the former group control.

In advantageous manner the new floor terminal is a start call terminal or a destination call terminal. If the new floor terminal is a destination call terminal, existing car terminals are made inaccessible. This also avoids a multiple input of a call, once as a destination call at the destination call terminal and then as a car call in the car terminal, which reduces the transport capacity of the elevator installation.

In advantageous manner the call detecting unit is to be demounted after transfer of the last of the elevators from the existing group control to the new group control. The call detecting unit can thus be reused in further modernizations.

In advantageous manner the call detecting unit or a new floor terminal comprises an interface for deriving signals such as start signals, acknowledgement signals and destination signals. In this manner the signals can be derived simply and quickly in future modernizations.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
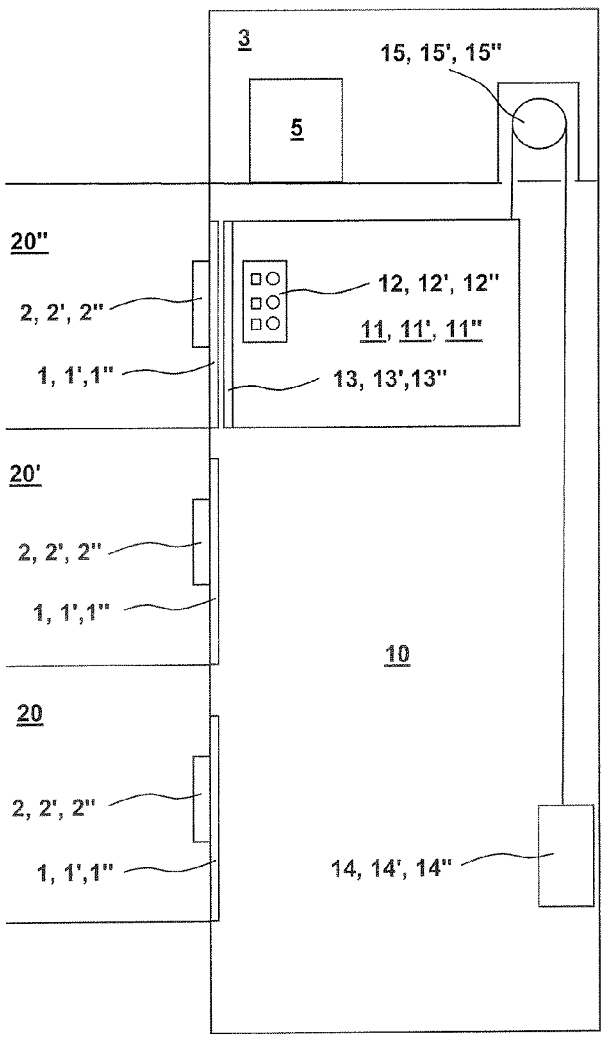
FIG. 1 is a schematic elevation view of a part of an elevator installation to be modernized.
Figure 2:
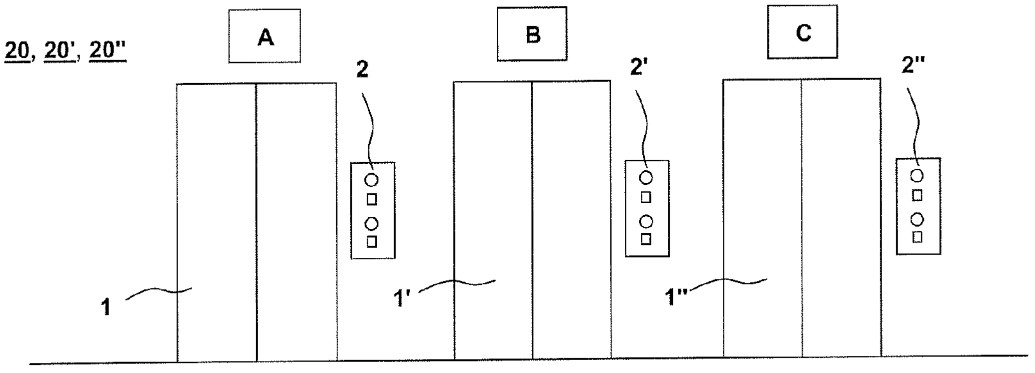
FIG. 2 is a schematic elevation view of a part of a floor of the elevator installation according to FIG. 1 to be modernized.

FIG. 1 shows a schematic view of a part of an elevator installation to be modernized. Further details can be inferred from FIG. 2. FIG. 2 shows a view of a part of a floor of the elevator installation according to FIG. 1 to be modernized. The elevator installation is installed in a building with, for example, three floors 20, 20', 20". Several elevator cars 11, 11', 11" are moved in at least one elevator shaft. For example, the elevator installation comprises three elevators A, B, C each with a respective elevator car 11, 11', 11". Each elevator car 11, 11', 11" is connected with a counterweight 14, 14', 14" by way of at least one support means. Each support means is driven by a drive 15, 15', 15". The drives 15, 15', 15" are, for example, arranged together with a group control 5 in an engine room 3 above the elevator shaft 10. Access to the elevator cars 11, 11', 11" takes place from the floors 20, 20', 20" by way of floor doors 1, 1', 1" and car doors 13, 13', 13". The floor doors 1, 1', 1" and the car doors 13, 13', 13" of the elevator cars 11, 11', 11" are opened and closed in a coordinated manner. In the example of FIGS. 1 and 2 this means that a floor door 1 of the left-hand elevator A on the third floor 20" and a car door 13 of the left-hand elevator A are opened only when the elevator car 11 of the elevator A is also disposed on the third floor 20".

At least one floor terminal is necessary for input of a floor call. According to FIG. 1, at least one floor terminal 2, 2', 2" is located on each floor 20, 20', 20" of the building. According to FIG. 2 exactly one floor terminal 2, 2', 2" is located on each floor 20, 20', 20" near each elevator A, B, C. The floor terminal 2, 2', 2" is, for communication of an input floor call, connected with the group control 5. A floor call indicates to the group control 5 the start floor from which a user would like to be moved in the building by an elevator A, B, C.

The elevators A, B, C are controlled in drive by the group control 5 in accordance with the communicated floor call. As soon as a user inputs a floor call on a floor 20, 20', 20" this is communicated as start floor to the group control 5. The group control 5 selects an elevator car 11, 11', 11" for servicing the floor call. This elevator car 11, 11', 11" is moved to the floor. The floor door 1, 1', 1" and the car door of the elevator car 11, 11', 11" are open and the user can enter the elevator car 11, 11', 11". The user thereupon delivers a car call in the elevator car 11, 11', 11". A car terminal 12, 12', 12" for input of a car call is located in each elevator car 11, 11', 11". The car terminal 12, 12', 12" is, for communication of an input car call, connected with the group control 5. The car call is communicated to the group control 5 as destination floor. The group control 5 now moves the elevator car 11, 11', 11" to this destination floor. After the elevator car 11, 11', 11" has moved into the destination floor, the floor door 1, 1', 1" and the car door of the elevator car 11, 11', 11" are opened and the user can leave the elevator car 11, 11', 11".

Figure 3:
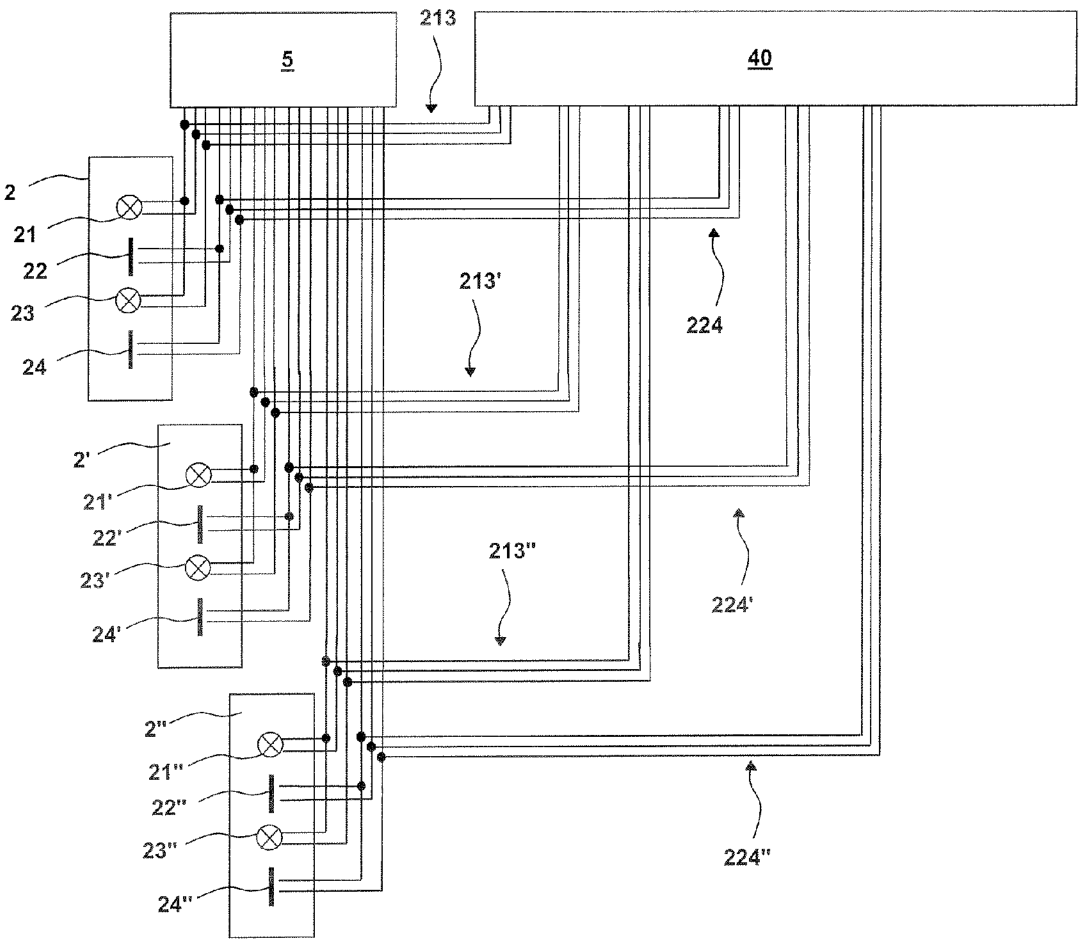
FIG. 3 is a schematic wiring diagram of a call detecting unit with existing floor terminals and an existing group control of an elevator installation according to FIGS. 1 and 2 to be modernized.

FIG. 3 shows further details of the floor terminal 2, 2', 2". For example, each floor terminal 2, 2', 2" has at least one call button 22, 22', 22", 24, 24', 24" and at least one acknowledgement lamp 21, 21', 21", 23, 23', 23". A floor call for an upward travel in the building is input by way of a call button 22, 22', 22" and a floor call for a downward travel in the building is input by way of a call button 24, 24', 24". The input of a floor call in the start floor is carried out, for example, by closing an electrical contact at the output of the call button 22, 22', 22", 24, 24', 24" so that an electric current flows, which is detected by the group control 5 as a start signal. The group control 5 confirms receipt of the floor call by activation of an acknowledgement lamp 21, 21', 21", 23, 23', 23" in the start floor. The receipt of a floor call for an upward travel is confirmed by an acknowledgement lamp 21, 21', 21" and the receipt of the floor call for a downward travel is confirmed by an acknowledgement lamp 23, 23', 23". The activation of an acknowledgement lamp 21, 21', 21", 23, 23', 23" is carried out, for example, by application of an electrical voltage to two outputs of the acknowledgement lamp 21, 21', 21", 23, 23', 23" so that this is supplied with electrical current and illuminates. This generation of an acknowledgement signal is also carried out by the group control 5. The group control 5 thus communicates bi-directionally with the floor terminal 2, 2', 2". It is communicated as a start signal which call button 22, 22', 22", 24, 24', 24" on which floor terminal 2, 2', 2" of which floor 20, 20', 20" was actuated and it confirms the receipt of such a floor call by an acknowledgement signal through activation of an acknowledgement lamp 21, 21', 21", 23, 23', 23" associated with the call button 22, 22', 22", 24, 24', 24". The acknowledgement lamp 21, 21', 21", 23, 23', 23" is deactivated only when the elevator car 11, 11', 11" has moved into the floor.

Figure 4:
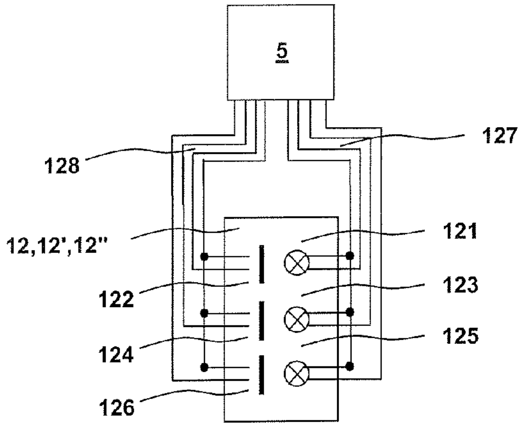
FIG. 4 is a schematic wiring diagram of the car terminals with an existing group control of an elevator installation according to FIGS. 1 and 2 to be modernized.

FIG. 4 shows details of the car terminal 12, 12', 12". The car terminal 12, 12', 12" functions in analogous mode and manner to the floor terminal 2, 2', 2". For example, each car terminal 12, 12', 12" has, for each floor 20, 20', 20" served by the elevator car 11, 11', 11", a call button 122, 124, 126 and an acknowledgement lamp 121, 123, 125. The input of a car call takes place by, for example, closing an electrical contact at the output of the call button 122, 124, 126 so that an electrical current, which is detected by the group control 5 as a destination signal, flows by way of communication lines 128. The group control 5 confirms receipt of the car call by activation of an acknowledgement lamp 121, 123, 125. The activation of an acknowledgement lamp 121, 123, 125 takes place by, for example, application of an electrical voltage via communication lines 127 to two outputs of the acknowledgement lamp 121, 123, 125 so that this is supplied with electrical current and illuminates. This generation of an acknowledgement signal is similarly carried out by the group control 5. The acknowledgement lamp 121, 123, 125 is deactivated only when the elevator car 11, 11', 11" has moved into the destination floor.

For modernization of the elevator installation at least one call detecting unit 40 is, for communication of an input floor call, connected with the existing group control 5. FIG. 3 shows with respect thereto a schematic wiring connection of a call detecting unit 40 with at least one existing floor terminal 2, 2', 2" and with the existing group control 5. The call detecting unit 40 is, for example, connected by way of communication lines 213, 213', 213", 224, 224', 224" with three floor terminals 2, 2', 2" and with the group control 5. The communication is bidirectional, communication lines 224, 224', 224" communicate a floor call, which is input at a floor terminal 2, 2', 2", to the call detecting unit 40 and communication lines 213, 213', 213" communicate the receipt of a floor call from the group control 5 to the call detecting unit 40. The communication lines 224, 224', 224" communicate not only an input floor call for a downward travel, but also an input floor call for an upward travel and the communication lines 213, 213', 213" communicate the receipt of an input floor call for a downward travel as well as the receipt of an input floor call for an upward travel. The communication lines 213, 213', 213", 224, 224', 224" are, for example, signal lines on which start signals and acknowledgement signals are conducted as electrical voltages and currents. According to FIG. 3 the signal lines lie parallel to one another and three signal lines each communicate two items of status data. Such signal lines can be laid simply and quickly between the floor terminals 2, 2', 2" and the call detecting unit 40 within the scope of the modernization of the elevator installation. In particular, such signal lines can be laid without the transport capacity of the elevator installation being prejudiced. In advantageous manner the call detecting unit 40 is connected with all floor terminals 2, 2', 2" on all floors 20, 20', 20".

Figure 5:
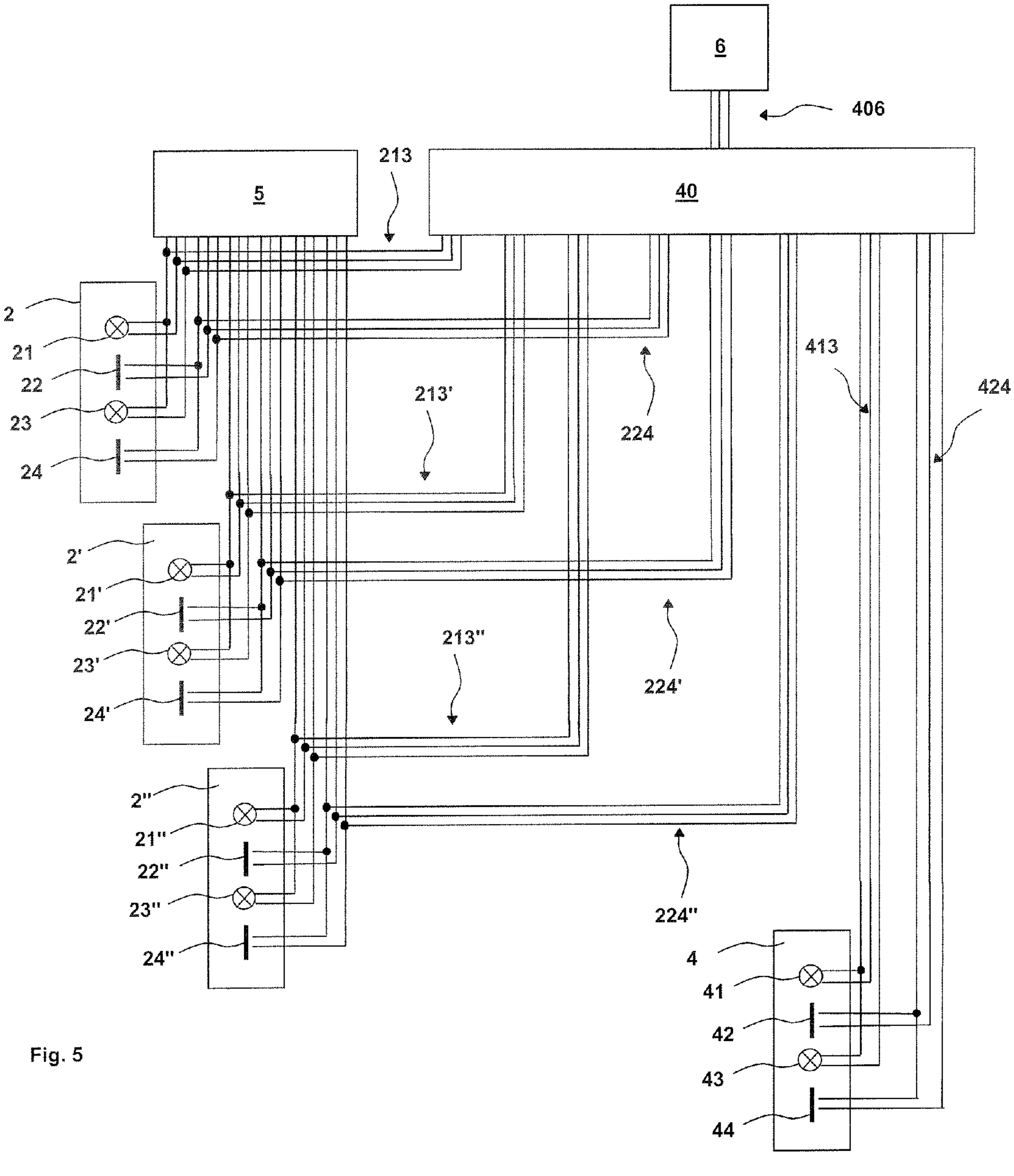
FIG. 5 is a schematic wiring diagram of a first embodiment of a call detecting unit according to FIG. 3 with the existing group control and with a new group control.
Figure 8:
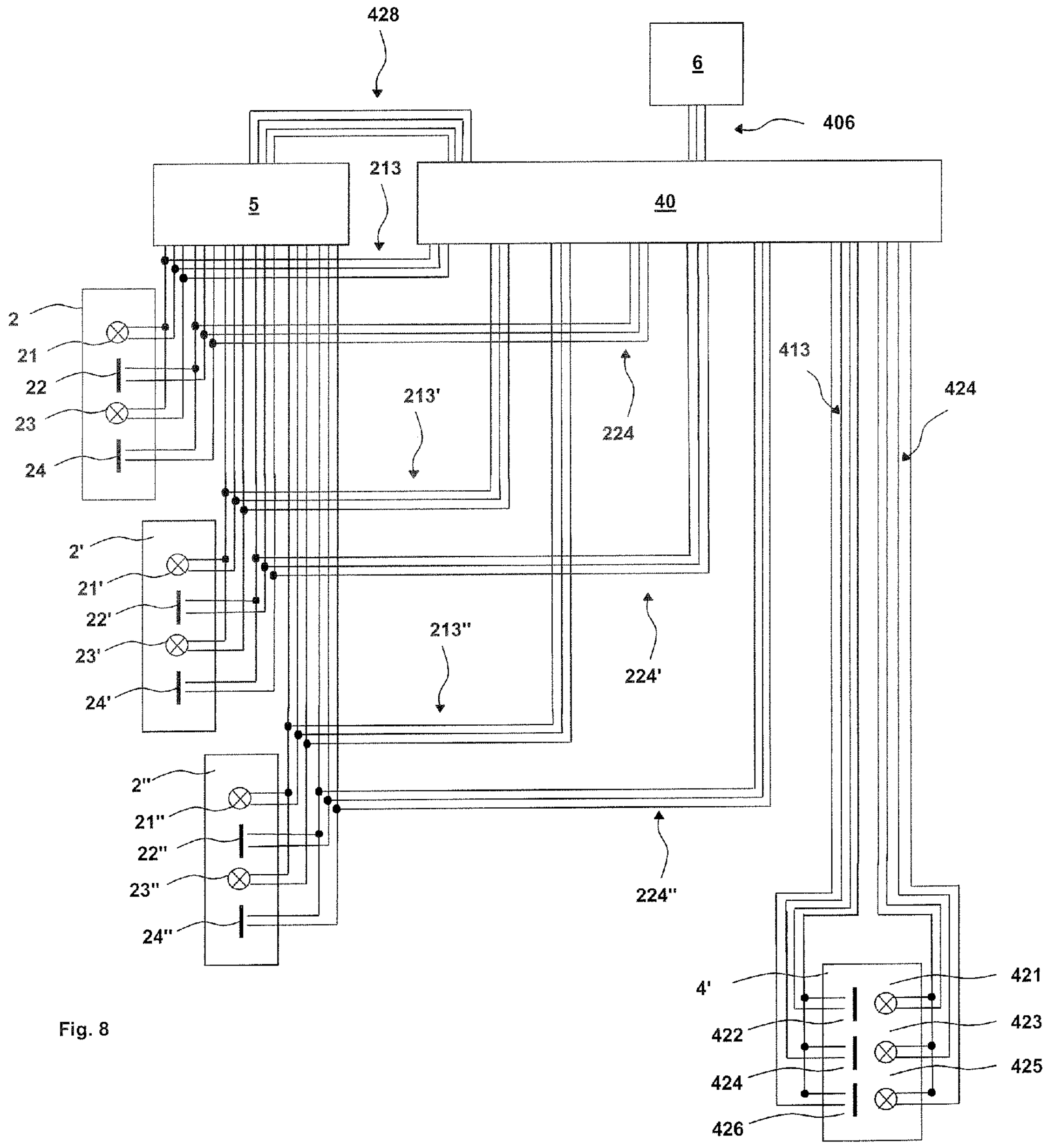
FIG. 8 is a schematic wiring diagram of a second embodiment of a call detecting unit according to FIG. 3 with the existing group control and with a new group control.

According to FIGS. 4, 5 and 8 the call detecting unit 40 has a larger number of inputs and outputs for the bidirectional communication via communications lines 213, 213', 213", 224, 224', 224", 413, 424, 428. The call detecting unit 40 therefore has suitable generators and sensors of electrical current and electrical voltage so as to detect and generate the start signals, destination signals and acknowledgement signals applied to the inputs and outputs.

As shown in the first embodiment of the wiring connection of a call detecting unit 40 according to FIG. 5, the call detecting unit 40 is an independent unit and, for example, installed in the engine room 3. The call detecting unit 40 can, however, also be a component of a new floor terminal 4' in a floor 20", which is shown in the second of the wiring connection of a call detecting unit 40 according to FIGS. 8 to 10.

The elevator installation to be modernized is now ready for exchange of at least one component of the elevator installation. Such components are the group control 5, the floor terminals 2, 2', 2", the drives 15, 15', 15", the floor doors 1, 1', 1", but also the elevator cars 11, 11', 11" and the counterweights 14, 14', 14".

Figure 6:
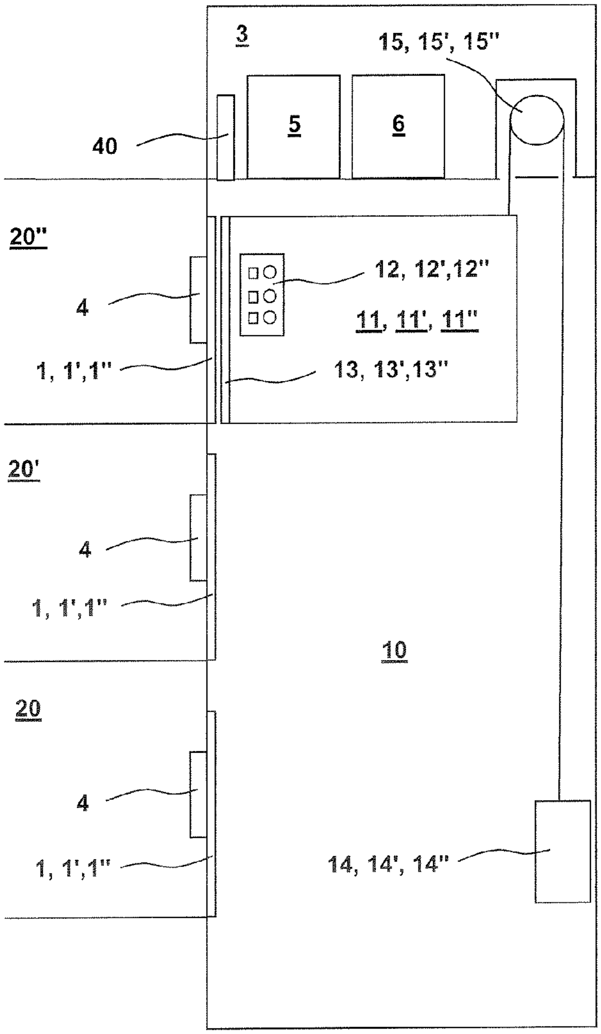
FIG. 6 is a schematic elevation view of a part of the elevator installation according to FIGS. 1 and 2, which is to be modernized, after wiring connection of the call detecting unit according to FIG. 5 with the existing group control and with the new group control.
Figure 7:
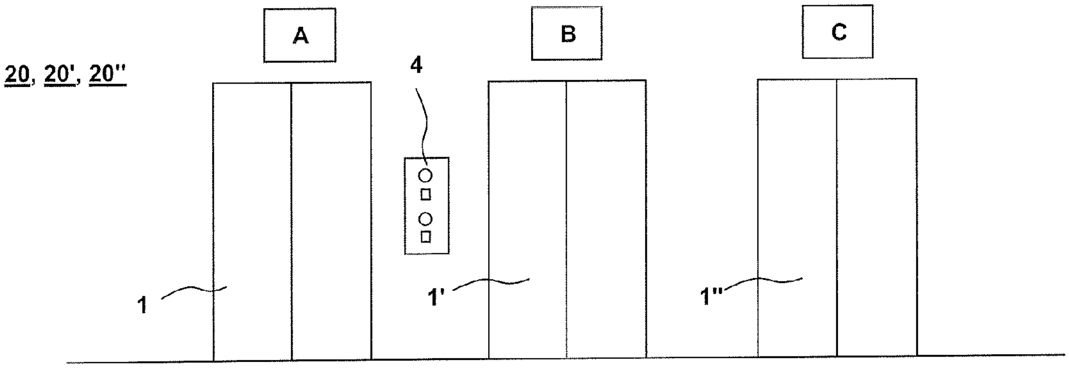
FIG. 7 is an elevation view of a part of a floor of the elevator installation according to FIG. 6 to be modernized.

As shown in FIGS. 6 and 7 as well as 9 and 10, at least one new floor terminal 4, 4' for input of a floor call is mounted on at least one floor 20, 20', 20". In an advantageous manner at least one new floor terminal 4, 4' is mounted on several floors 20, 20', 20". Advantageously, at least one new floor terminal 4, 4' is mounted on each floor 20, 20', 20". As shown in FIGS. 5 and 8, the communication of the new floor terminal 4, 4' with the call detecting unit 40 is bidirectional. Communication lines 413, 424 provided for that purpose are, for example, signal lines on which electrical voltages and currents are conducted. These signal lines can be part of a bus system, such as an LON bus.

The new floor terminal 4 of the first form of embodiment of the wiring connection of a call detecting unit 40 according to FIGS. 5 to 7 is in that case functionally identical with the former floor terminals 2, 2', 2" and thus a start call terminal. In detail, FIG. 5 shows with respect thereto a schematic wiring connection of a new floor terminal 4 for communication of an input floor call with the call detecting unit 40. For example, the new floor terminal 4 has at least one call button 42, 44 and at least one acknowledgement lamp 41, 43. A floor call for an upward travel in the building is input by way of a call button 42 and a floor call for a downward travel in the building is input by way of a call button 44. The receipt of a destination call for an upward travel is confirmed by an acknowledgement lamp 41 and the receipt of a floor call for a downward travel is confirmed by an acknowledgement lamp 43. At least one communication line 424 communicates to the call detecting unit 40 a floor call input at the new floor terminal 4 and at least one communication line 413 communicates to the new floor terminal 4 the receipt of a floor call from the group control 5. The call detecting unit 40 communicates the start floor of an input floor call by way of the communication lines 224, 224', 224" as a start signal to the group control 5 and the group control 5 communicates the receipt of an input floor call as an acknowledgement signal by way of the communication lines 213, 213', 213" to the call detecting unit 40.

Figure 9:
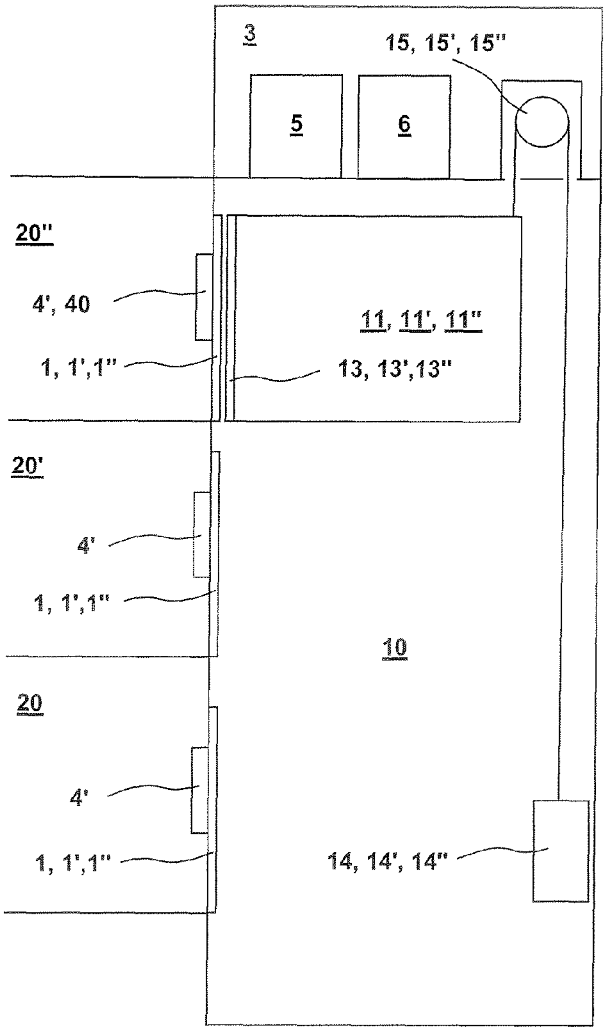
FIG. 9 is a schematic elevation view of a part of the elevator installation according to FIGS. 1 and 2, which is to be modernized, after wiring connection of the call detecting unit according to FIG. 8 with the existing group control and with the new group control.
Figure 10:
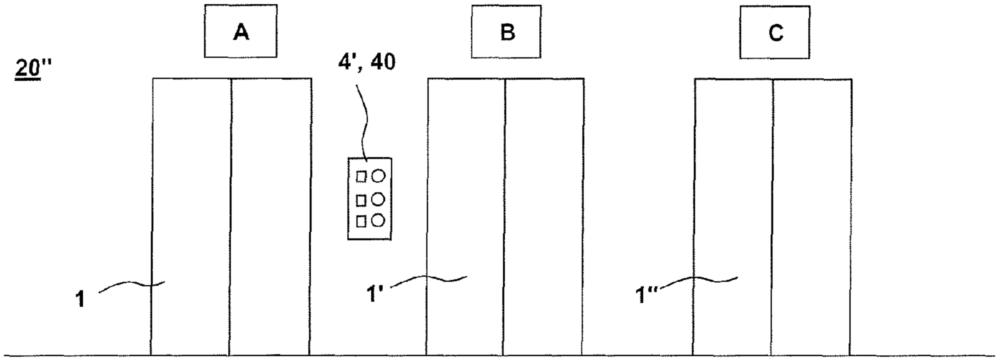
FIG. 10 is an elevation view of a part of a floor of the elevator installation according to FIG. 9 to be modernized.

FIGS. 8 to 10 show a second form of embodiment of the wiring connection of a call detecting unit 40, which is a component of a new floor terminal 4'. The new floor terminal 4' according to FIGS. 8 to 10 is in that case functionally identical with the former age call terminals 12, 12', 12" and is thus a destination call terminal. The new floor terminal 4' has, for each floor 20, 20', 20" served by the elevator cars 11, 11', 11", a call button 422, 424, 426 and an acknowledgement lamp 421, 423, 425.

In detail, FIG. 8 shows with respect to thereto a schematic wiring connection of a new floor terminal 4' for communication of an input floor call by way of the call detecting unit 40 to the group control 5. At least one communication line 424 communicates to the call detecting unit 40 a floor call input at the new floor terminal 4' and at least one communication line 413 communicates to the new floor terminal 4' the receipt of a floor call from the group control 5. The call detecting unit 40 communicates the start floor of the input floor call by way of the communication lines 224, 224', 224" as a start signal to the group control 5 and the group control 5 communicates the receipt of an input floor call as an acknowledgement signal by way of the communication lines 213, 213', 213" to the call detecting unit 40. After an elevator car 11, 11', 11" serving the floor call has been moved by the group control 5 to the start floor, the group control 5 deactivates the acknowledgement signal on one of the communication lines 213, 213', 213". The call detecting unit 40 detects this deactivation of the acknowledgement signal and thereupon communicates, as a response, the destination floor of the floor call, which is input at the new floor terminal 4', as destination signal via a communication line 428 to the group control 5. For this purpose the call detecting unit 40 comprises a suitable sensor, which, for example, detects the acknowledgement signal, which is present as an electrical voltage at the outputs of the communication lines 213, 213', 213", of the group control 5. In addition, the call detecting unit 40 comprises a suitable generator in order to, for example, generate the destination signal flowing, as an electrical current, via communications lines 428 to the group control 5. The shape and size of the destination signals are detectable simply and quickly, because they are applied to the outputs 128 of the call buttons 122, 124, 126 of the car terminal 12, 12', 12" as soon as a car call is input. They can thus be tapped off there in a learning phase and stored in a data memory of the call detecting unit 40.

The new floor terminal 4, 4' is thus indirectly connected, i.e. by way of the call detecting unit 40, with the existing group control 5. As shown in the embodiments according to FIGS. 6 and 7 as well as 9 and 10, the existing floor terminals 2, 2', 2" on the floors 20, 20', 20" are made inaccessible so that the input of a floor call takes place only by way of a new floor terminal 4, 4'. A user can no longer input a floor call at an inaccessible existing floor terminal 2, 2', 2". For example, a wall is drawn up in front of the existing floor terminal 2, 2', 2" so that the existing floor terminals 2, 2', 2" are no longer visible to the user or are dissimulated or also physically unreachable. However, it is also possible to cap the signal lines of the call buttons 22, 22', 22", 24, 24', 24" of the existing floor terminals 2, 2', 2" to the group control 5 and to place an item of user information, according to which the existing floor terminals 2, 2', 2" are deactivated for the input of a floor call. As shown in the form of embodiment according to FIG. 9, the car terminals 12, 12', 12" are also made inaccessible in the same mode and manner during the installation of a new floor terminal 4' which functions as a destination call terminal, so that not only the input of a floor call, but also that of a car call are carried out only as input of a destination call by way of a new floor terminal 4, 4'.

The call detecting unit 40 or a new floor terminal 4, 4' advantageously comprises interfaces for deriving signals such as start signals, acknowledgement signals and destination signals. For example, a call detecting unit 40 or a new floor terminal 4, 4' comprises a simple and quickly reachable interface. Such an interface is, for example, mounted laterally outside at a housing of the call detecting unit 40 or of the new floor terminal 4, 4'. Any interfaces of proven industry standards such as RS232, USB, FTT10, etc., can be used. In this manner the signals can be derived in simple and quick manner in the case of future modernizations.

As soon as a new group control 6 is now installed within the scope of the modernization of the elevator installation and at least one elevator A, B, C of the existing group control 5 is transferred to the new group control 6, so that the transferred elevator A, B, C is controlled in drive by the new group control 6, the new group control 6 is also connected, for communication of an input floor call, with the call detecting unit 40. FIG. 6 shows in detail how, for example, a new group control 6 is installed in the engine room 3.

During the modernization the call detecting unit 40 thus communicates not only with the old group control 5, but also with the new group control 6. This allows a distribution of the input floor calls to the hold group control 5 and to the new group control 6. Advantageously, floor calls, which are input at the new floor terminal 4, 4', are distributed to the existing group control 5 and to the new group control 6 in accordance with at least one rule. In advantageous manner, a random distribution or an alternating distribution or a performance-related distribution is used as the rule. For this purpose the call detecting unit 40 comprises at least one electric processor with at least one data memory. An algorithm which is loaded into the electric processor and is executed by the electric processor is stored in the data memory. The algorithm executes this rule. For example, the algorithm comprises a first parameter "P1" indicating the number of elevators A, B, C of the elevator installation, which are controlled in drive by the existing group control 5. A second parameter "P2" of the algorithm indicates the number of elevators A, B, C which are controlled in drive by the new group control 6. In addition, the algorithm comprises a third parameter "K1" for the capacity of the existing group control 5 and a fourth parameter "K2" for the capacity of the new group control 6. Moreover, the algorithm executes a selective call allocation. The fifth parameter "Z1" denotes the call allocation to the existing group control 5 and "Z1-1" denotes the call allocation to the new group control 6. An effective transport capacity "TKE" results therefrom as follows:

$$TKE=P1\cdot K1\cdot Z1+P2\cdot K2\cdot(1-Z1)$$

For the case that one of the three elevators A, B, C for modernization is dependent on the existing group control 5 and thus in principle is not available and that a further one of the three elevators A, B, C is dependent on the new group control 6, it follows that: P1=P2=1. In the case of a capacity of the new group control 6 being 20% higher than the capacity of the existing group control 5, it follows that: K2=1.2·K1.

A random allocation or an alternating allocation of the input floor calls to the existing group control 5 and to the new group control 6 corresponds with: Z1=(1−Z1)=0.5. In the present case, an effective transport capacity of TKE=1.1 then results.

The algorithm now allows a selective consideration of the higher capacity "K2" of the new group control 6 in that a relatively small call allocation "Z1" takes place at the existing group control 5. For Z1=0.2 there then results an effective transport capacity PKE=1.16, a value which is 6% higher than that of the random allocation or the alternating allocation.

The parameters of the algorithm can be adapted in simple manner to the changing transport capacity of the elevator installation during the modernization.

After transfer of the last of the elevators A, B, C from the existing group control 5 to the new group control 6 the call detecting unit can be demounted.

With knowledge of the present invention it is possible to realize numerous variations of the illustrated example of embodiment. Thus, the building can comprise more than three floors and the elevator installation can also consist of more than three elevators. It is obviously also possible to use elevators without counterweights. Equally, elevators without support means can be used. The drives can also be arranged in the elevator shaft. In addition, the group control as well as the call detecting unit can be arranged in any desired space of the building, so that an engine room is not necessary. Equally, use can be made of floor terminals with more than two call buttons. Moreover, it is not necessary for the floor terminals to have acknowledgement lamps. The signal lines can be connected in parallel or also serially with the call detecting unit.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for modernization of an elevator installation with several elevators in a building, with at least one existing floor terminal for input of a floor call on at least one floor of the building, which said at least one existing floor terminal is, for communication of an input floor call, connected with an existing group control, and at least one of said several elevators is controlled in drive in accordance with the communicated floor call from the existing group control, comprising the steps of:

connecting at least one call detecting unit, for communication of an input floor call, with an existing connection between the existing group control and said at least one existing floor terminal;

mounting at least one new floor terminal, for input of a floor call, on at least one floor; and connecting the at least one new floor terminal, for communication of an input floor call, with the at least one call detecting unit.

2. The method according to claim 1 including on the floor where the at least one new floor terminal is mounted making said at least one existing floor terminal inaccessible.

3. The method according to claim 1 including installing a new group control and transferring at least one of said several elevators from the existing group control to the new group control, the transferred elevator being controlled in drive by the new group control and connecting the at least one call detecting unit, for communication of an input floor, with the new group control.

4. The method according to claim 3 including distributing floor calls input at said at least one new floor terminal to the existing group control and to the new group control in accordance with at least one rule.

5. The method according to claim 4 wherein the at least one rule is a random distribution, an alternating distribution or a performance-related distribution.

6. The method according to claim 1 including mounting said at least one new floor terminal, for input of a floor call, on several floors and connecting the new floor terminals, for communication of an input floor call, with the at least one call detecting unit.

7. The method according to claim 1 including communicating a start floor of the input floor call as a start signal to the existing group control by the call detecting unit and communicating receipt of the input floor call as an acknowledgement signal to the at least one call detecting unit by the existing group control.

8. The method according to claim 7 including detecting deactivation of the acknowledgement signal by the at least one call detecting unit.

9. The method according to claim 8 including communicating a destination floor of the input floor call as a destination signal to the group control by the at least one call detecting unit.

10. The method according to claim 1 including that if the at least one new floor terminal is a destination call terminal, making existing car terminals inaccessible.

11. The method according to claim 1 including demounting the at least one call detecting unit after transfer of the last of the elevators from the existing group control to a new group control.

12. A system for modernization of an elevator installation with several elevators in a building, with at least one existing floor terminal for input of a floor call on at least one floor of the building, which said at least one existing floor terminal is, for communication of an input floor call, connected with an existing group control, and at least one of the elevators is controlled in drive in accordance with the communicated floor call from the existing group control, comprising:

at least one new floor terminal, for input of a floor call, mounted on at least one floor;

said at least one new floor terminal being, for communication of an input floor call, connected with at least one call detecting unit; and said at least one call detecting unit being, for communication of an input floor call, connected with an existing connection between the existing group control and said at least one existing floor terminal.

13. The system according to claim 12 wherein said at least one call detecting unit is an independent unit or a component of said at least one new floor terminal.

14. The system according to claim 12 wherein said at least one call detecting unit is mounted per floor.

15. The system according to claim 12 wherein said at least one new floor terminal is a start call terminal or a destination call terminal.

16. The system according to claim 12 wherein said at least one call detecting unit or said at least one new floor terminal includes an interface for deriving signals including at least one of start signals, acknowledgement signals and destination signals.

* * * * *